(12) United States Patent
Chennupalli et al.

(10) Patent No.: US 10,752,288 B2
(45) Date of Patent: Aug. 25, 2020

(54) LATERAL MOTION CONTROL FOR CORNERING AND REGENERATIVE BRAKING ENERGY CAPTURE

(71) Applicant: Ford Global Technologies, LLC, Dearborn, MI (US)

(72) Inventors: Girish Gokul Chennupalli, Farmington Hills, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 15/958,256

(22) Filed: Apr. 20, 2018

(65) Prior Publication Data
US 2019/0322316 A1   Oct. 24, 2019

(51) Int. Cl.
| B62D 11/04 | (2006.01) |
| B62D 11/00 | (2006.01) |
| B62D 11/10 | (2006.01) |
| B60K 6/52 | (2007.10) |
| B60W 30/18 | (2012.01) |
| B60W 10/16 | (2012.01) |
| B60W 10/08 | (2006.01) |

(52) U.S. Cl.
CPC ........... *B62D 11/04* (2013.01); *B60K 6/52* (2013.01); *B60W 10/08* (2013.01); *B60W 10/16* (2013.01); *B60W 30/18145* (2013.01); *B62D 11/003* (2013.01); *B62D 11/10* (2013.01); *B60W 2510/085* (2013.01); *B60W 2510/20* (2013.01); *B60W 2710/086* (2013.01); *B60W 2710/12* (2013.01); *Y10S 903/903* (2013.01)

(58) Field of Classification Search
CPC ........................................................ B62D 11/04
See application file for complete search history.

(56) References Cited

U.S. PATENT DOCUMENTS

| 6,909,959 | B2 | 6/2005 | Hallowell |
| 7,455,142 | B2 | 11/2008 | Post, II |
| 8,565,935 | B2 | 10/2013 | Mizutani et al. |
| 8,989,981 | B2 | 3/2015 | Yamakado et al. |
| 2016/0214603 | A1 | 7/2016 | Owen et al. |
| 2019/0275994 | A1* | 9/2019 | Zhao .................. B60L 58/12 |

* cited by examiner

*Primary Examiner* — Kevin Hurley
(74) *Attorney, Agent, or Firm* — David B. Kelley; Brooks Kushman P.C.

(57) ABSTRACT

A vehicle includes motors each configured to drive a front wheel of the vehicle, an electronic limited slip differential (eLSD) between rear wheels of the vehicle, and a controller to, responsive to vehicle turning and a power of each of the motors being less than a maximum value, alter operation of the motors to increase a difference between the powers. Otherwise, the controller operates the eLSD to bias torque toward one of the rear wheels.

6 Claims, 3 Drawing Sheets

LATERAL MOTION CONTROL FOR CORNERING AND REGENERATIVE BRAKING ENERGY CAPTURE

TECHNICAL FIELD

This disclosure relates to the control of automotive vehicles that include drive-torque-producing electric motors.

BACKGROUND

Hybrid-electric vehicles and the like often include one or more electric motors and an engine to propel the vehicle. Electric and non-electric sources of energy may thus be selectively used during driving. Vehicle performance and fuel economy can be affected based on whether and how one or both of these propulsion sources are used under various operating circumstances, such as braking and turning.

SUMMARY

A vehicle includes motors each configured to drive a front wheel of the vehicle, an electronic limited slip differential (eLSD) between rear wheels of the vehicle, and a controller that, responsive to vehicle turning and a power of each of the motors being less than a maximum value, alter operation of the motors to increase a difference between the powers, and otherwise, operate the eLSD to bias torque toward one of the rear wheels.

A method for operating a vehicle includes, responsive to turning of the vehicle and powers of motors configured to drive front wheels of the vehicle being less than a maximum value, altering operation of the motors to increase a difference between the powers, and responsive to turning of the vehicle and the powers being at the maximum value, operating an electronic limited slip differential to bias torque toward one of rear wheels of the vehicle.

An automotive drivetrain includes passenger side and driver side motors each to drive respectively passenger side and driver side wheels, an electronic limited slip differential (eLSD) coupled between other passenger side and driver side wheels, and a controller. The controller, responsive to a steering angle falling within a predefined range of values and a power of each of the motors being less than a maximum value, alters operation of the motors to increase a difference between the powers, and responsive to the steering angle falling within the predefined range and the powers being at the maximum value, operates the eLSD to bias torque toward one of the other passenger side and driver side wheels.

DETAILED DESCRIPTION

Figure 1:
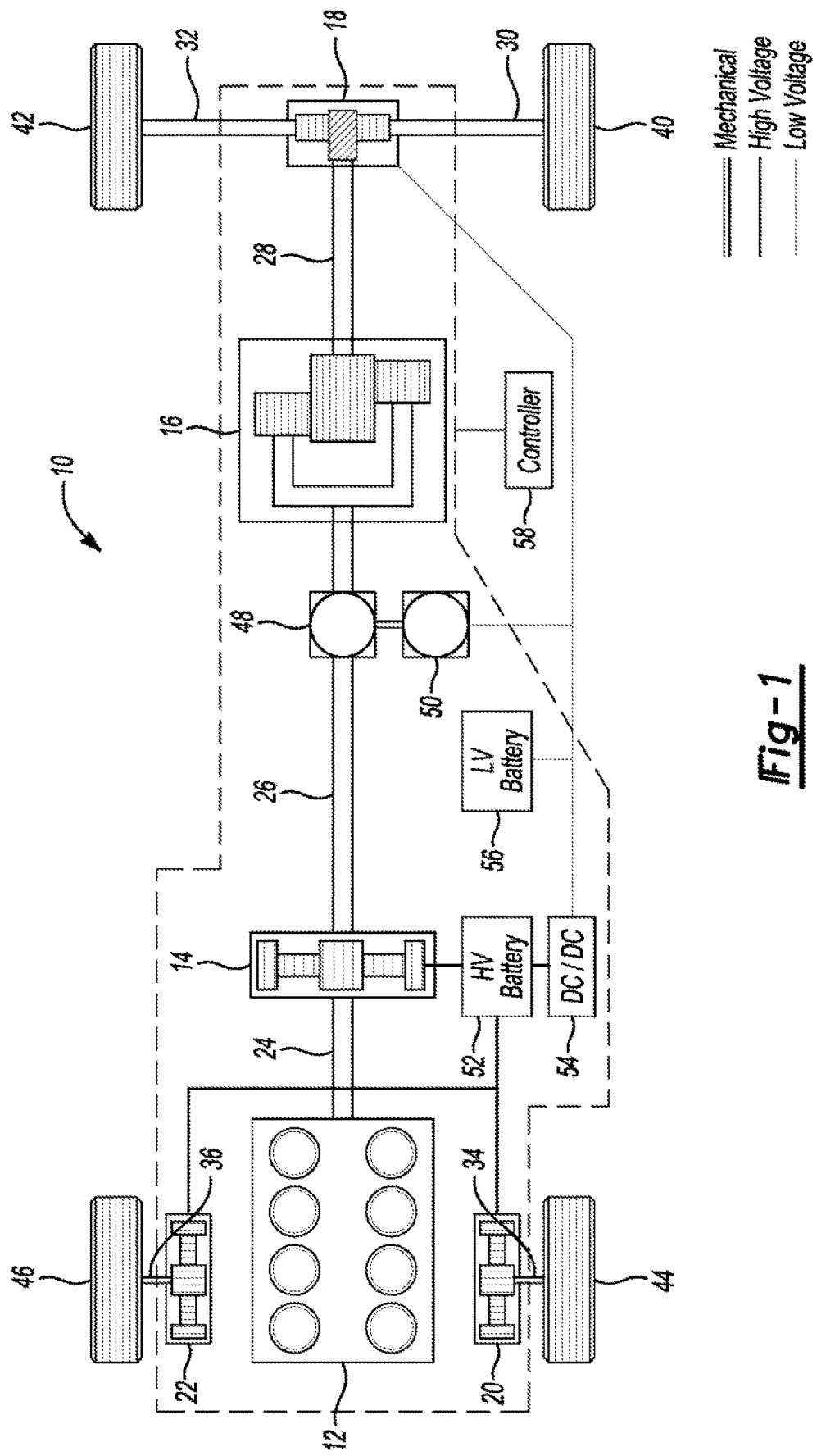
FIG. 1 is a schematic illustration of a vehicle.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Powertrains are contemplated that, in certain architectures, include a crank integrated starter generator available to start as well as supplement the engine. A transmission converts engine and motor torque to transmission output torque. The transmission output is coupled to an electronic limited slip differential which has the capability to couple the transmission output to one or both rear wheels. A mechanical transmission oil pump can be located on the same shaft as the electric motor generator to provide oil flow through the transmission for lubrication and hydraulic operation. This main pump may be supplemented by an electric auxiliary pump. Each front wheel is driven by a high voltage motor which is mounted on the chassis, and coupled to the front wheel through a shaft and single speed gear box.

Under normal operation, driver requests are interpreted by the vehicle system control. These requests include gear selection (PRNDL) and accelerator pedal position to interpret driver intention on the wheel torque. A driver's input on the brake pedal is interpreted by the brake system control module and a wheel torque modification request is sent to the vehicle system control to adjust the final wheel torque. The high voltage battery controller monitors the battery temperature, voltage, current, and state of charge, and determines the maximum allowable discharge power limit and the maximum allowable charge power limit. The vehicle system control determines the powertrain operating point to maintain battery state of charge, minimize fuel consumption, and deliver the driver demanded vehicle operation. A torque control feature inside the vehicle system control oversees determining torque split between the engine and motor torque command, and a wheel torque distribution feature determines the torque split between front and rear propulsion.

In a vehicle containing motors on the front and rear axles, or motors on the front axle and an electronic limited slip differential on the rear axle, it is possible to shift lateral motion of the vehicle with the front axle, the rear axle, or a combination of both. Lateral bias can thus be changed electrically on the front axle, and mechanically on the rear axle, or a combination of both. Additionally, the front axle is considered active since electric motors can be used to add or subtract torque, whereas the rear axle is considered passive since the electronic limited slip differential can only be used to subtract torque.

Here, control algorithms determine when to shift lateral bias using electric motors on the front axle, to shift lateral bias on the rear axle via an electronic limited slip differential, or to use a combination of both. The method may take into consideration whether the vehicle is accelerating or decelerating, the limits of the motors and high voltage battery, traction limits, steering wheel position, and desire to collect regenerative braking energy. Based upon these inputs, the algorithms determine which front motor is appropriate to increase or decrease torque to shift the lateral bias.

Preference may be given to the most capable and efficient power source during acceleration, as well as collecting the maximum amount of regenerative braking energy during deceleration.

During acceleration, the engine-driven rear axle is the primary power source to propel the vehicle. If lateral bias is desired during acceleration, the appropriate front motor torque is modulated to provide the desired lateral bias. In this way, the maximum amount of acceleration can be achieved. During deceleration, the regenerative braking capability of the front motors is used to its maximum, and the rear electronic limited slip differential is used to provide lateral bias. In this way, the maximum regenerative braking energy can be recaptured.

Some previous solutions reduce the amount of regenerative braking below estimation during cornering since torque vectoring is not performed by individual motors. This can reduce the energy recuperation to the battery thereby affecting the fuel economy. The implementations contemplated here can also help to improve the cornering feel of the vehicle.

For a front driven independent electric motor vehicle, use of the front driven electrical motors increases the fuel economy and maximizes the regenerative energy recuperation. During cornering, the moment of inertia/weight shifts either left or right. The adjustment in the torque (torque vectoring) of each motor/combination of motors on the front can effectively improve handling at corners. During a left turn, the moment of inertia shifts right. Torque vectoring can be achieved using the front motors by reducing the regenerative braking torque on the right wheel and increasing the regenerative torque on the left wheel, and vice versa for a right turn. On the other side, the propulsive torque on the left front wheel can be reduced and the propulsive torque on the right front wheel can be increased to perform smooth handling during corners. The propulsive torque on the left wheel can be increased and torque on the right wheel can be reduced for a right turn. For a rear wheel driven electric vehicle, the cornering stability can be effectively provided by adjusting the torques on each wheel or motor. If the rear wheels are driven by a single motor, torque vectoring can be achieved using an electronic limited slip differential clutch. If the rear wheels are driven by independent motors, torque vectoring can be achieved using the rear motors by reducing the regenerative braking torque on the right wheel and increasing the regenerative torque on the left wheel for a left turn and vice versa for a right turn. Other scenarios are also contemplated.

For an all-wheel drive electric vehicle, a combination of an electronic limited slip differential and rear driven motors can effectively increase handling stability during cornering. When the front motors are maxed out during regenerative braking (the motors are at the maximum limit for regenerative braking), torque vectoring can be achieved using the electronic limited slip differential during cornering. When the front motors are maxed out during acceleration (the motors are at the maximum limit for acceleration), torque vectoring can be achieved using the electronic limited slip differential during cornering.

Given the scenarios described above, current flowing into the battery from the left wheel during a left turn can be greater than the right wheel, and vice versa for a right turn. An approximately equal amount of current can be observed on each of the front wheels during straight line motion whereas different current values can be observed on the front wheels during cornering. During deceleration when an equal amount of current values is associated with the front wheels, the moment of inertia has been changed with the electronic limited slip differential to capture as much regenerative energy as possible. Thus, during deceleration when an equal amount of current is associated with the front wheels, the torque on each of the rear wheels is different due to operation of the electronic limited slip differential.

With reference to FIG. 1, a vehicle 10 includes an engine 12, a crank integrated starter generator 14, a transmission (e.g., dual clutch transmission) 16, an electronic limited slip differential 18, and motors 20, 22. The vehicle 10 also includes shafts 24, 26, 28, 30, 32, 34, 36 and wheels 40, 42, 44, 46. The shaft 24 mechanically couples the engine 12 and crank integrated starter generator 14. The shaft 26 mechanically couples the crank integrated starter generator 14 and the transmission 16. The shaft 28 mechanically couples the transmission 16 and electronic limited slip differential 18. The shaft 30 mechanically couples the electronic limited slip differential 18 and wheel 40. The shaft 32 mechanically couples the electronic limited slip differential 18 and wheel 42. The shaft 34 mechanically couples the motor 20 and wheel 44. And the shaft 36 mechanically couples the motor 22 and wheel 46. The engine 12, crank integrated starter generator 14, transmission 16, and electronic limited slip differential 18 in this example are thus mechanically in series.

The vehicle 10 further includes mechanical transmission pump 48, electric transmission pump 50, traction (high voltage) battery 52, auxiliary (low voltage) battery 54, DC/DC converter 56, and controller(s) 58. The controller(s) 58 (brake system controller, engine system controller, vehicle system controller, etc.) is arranged to communicate with and/or control the elements contained within the dashed box. Hence, actions performed by these elements can be responsive to commands issued by the controller(s) 58.

The traction battery 52 is electrically coupled with the motors 20, 22, the crank integrated starter generator 14, and the DC/DC converter 54. Power from the traction battery 52 can thus be directed to either or both of the motors 20, 22, the crank integrated starter generator 14, and the DC/DC 54 converter as desired. Likewise, power from the motors 20, 22 can be directed to the traction battery 52 for energy capture. The auxiliary battery 56 is electrically coupled with the DC/DC converter 54, the electric transmission pump 50, and the electronic limited slip differential 18. Power from the auxiliary battery 56 (and/or DC/DC converter 54) can thus be directed to the electric transmission pump 50 and electronic limited slip differential 18 as desired. And, power from the DC/DC converter 54 can be directed to the auxiliary battery 56 for energy capture.

Figure 2A:
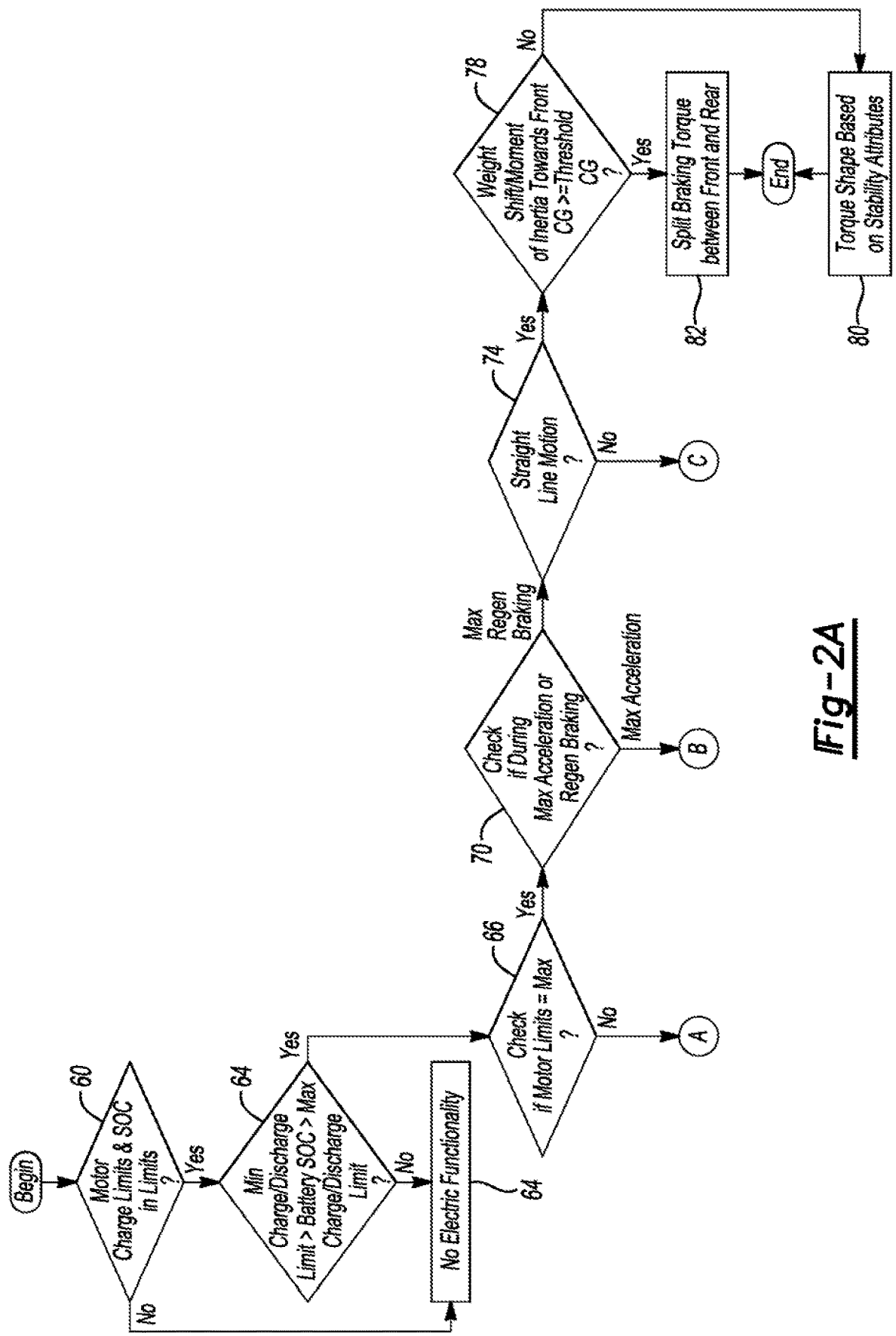
FIGS. 2A and 2B are a flow chart of an algorithm for controlling the vehicle of FIG. 1.
Figure 2B:
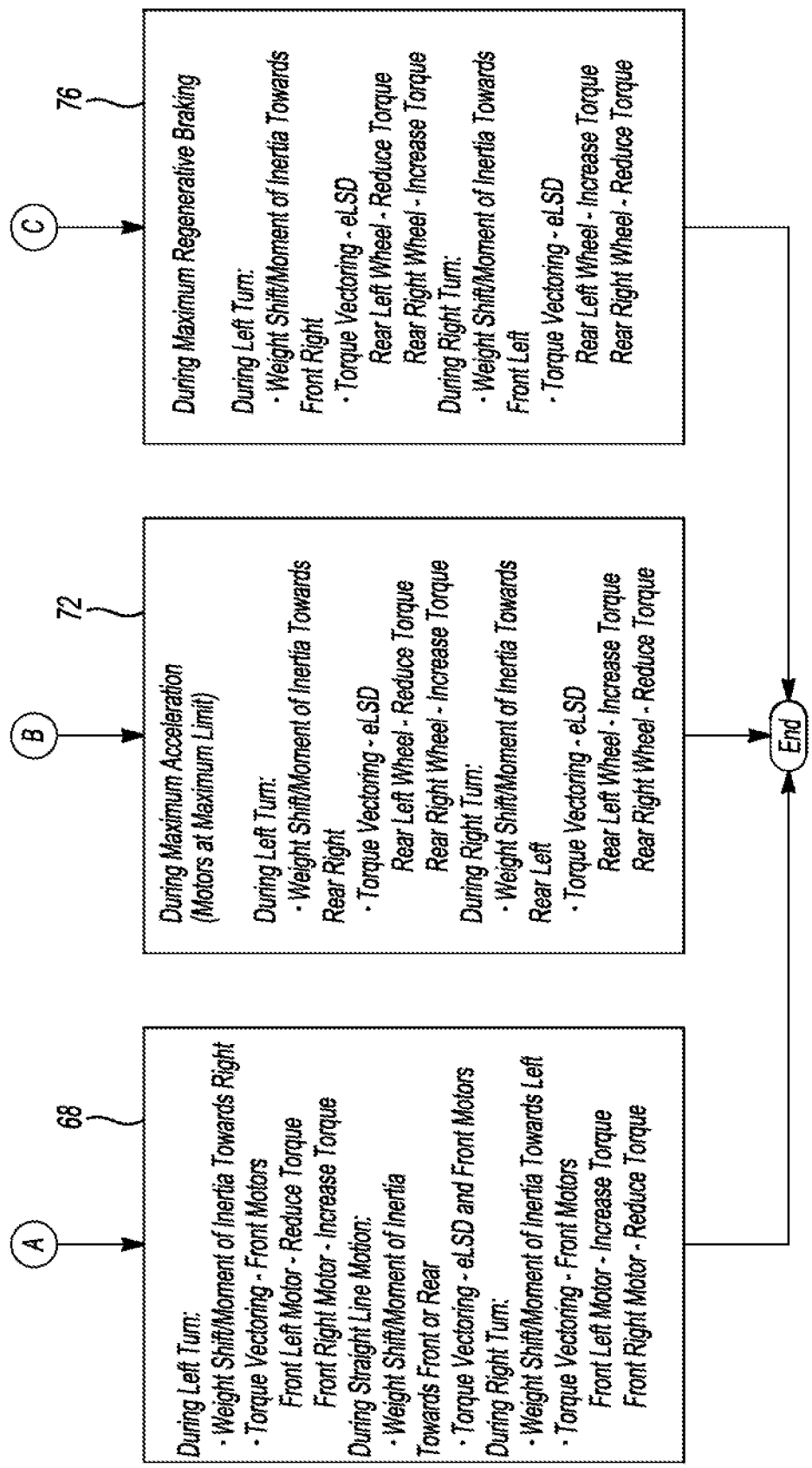

With reference to FIGS. 1 and 2, the controller(s) 58 determines whether the motors 20, 22 and the state of charge of the traction battery 52 are within normal operational limits at operation 60. Values outside these limits indicate that electric functionality is not available. As such, the controller(s) 58 proceeds to no electric functionality conclusion box 62 if no. If yes, the controller(s) 58 at operation 64 determines whether the charge/discharge capability of the traction battery 52 falls within minimum and maximum charge/discharge limits as traction battery temperature and the like may affect the rate at which the traction battery 52 can receive or provide charge. If no, the controller(s) 58 proceeds to the no electric functionality conclusion box 62. If yes, the controller(s) 58 at operation 66 determines whether the motors 22, 24 are operating at their maximum. The controller(s) 58 may, for example, compare power from or to the motors 22, 24 against predefined maximum limits. If no, the controller(s) 58 at operation 68 will operate to further shift the moment of inertia of the vehicle 10 to the right during a left turn by reducing torque produced by (power provided to) the motor 22 and increasing torque produced by (power provided to) the motor 24, and to the left during a right turn by increasing torque produced by the motor 22 and decreasing torque produced by the motor 24. The extent to which the controller(s) 58 so reduces and increases the power may depend on the degree to which the vehicle is being turned. The greater the turning angle, the greater the relative reduction and increase. During straight line movement, the controller(s) 58 may operate to shift the moment of inertia of the vehicle 10 to the front or rear as desired using the motors 22, 24 and/or the electronic limited slip differential 18.

Returning to operation 66, if yes, the controller(s) 58 at operation 70 determines whether the vehicle 10 is accelerating or braking. The controller(s) 58 may check direction of current flow to or from the motors 22, 24—to being indicative of accelerating and from being indicative of regenerative braking. Given that operation 70 follows operation 66, such accelerating or regenerative braking is necessarily at the maximum. If maximum acceleration is found, the controller(s) 58 at operation 72 will operate to shift the moment of inertia of the vehicle 10 to the right during a left turn by decreasing torque provided to the wheel 40 and increasing torque provided to the wheel 42 via the electronic limited slip differential 18, and to the left during a right turn by increasing torque provided to the wheel 40 and decreasing torque provided to the wheel 42 via the electronic limited slip differential 18.

Returning to operation 70, if maximum regenerative braking is found, the controller(s) 58 at operation 74 determines whether the vehicle 10 is engaged in straight line motion. The controller(s) 58 may, for example, check steering angle, etc. If the vehicle 10 is not engaged in straight line motion, the controller(s) 58 at operation 72 will operate to shift the moment of inertia of the vehicle 10 to the right during a left turn by decreasing torque provided to the wheel 40 and increasing torque provided to the wheel 42 via the electronic limited slip differential 18, and to the left during a right turn by increasing torque provided to the wheel 40 and decreasing torque provided to the wheel 42 via the electronic limited slip differential 18.

Returning to operation 74, if the vehicle 10 is engaged in straight line motion, the controller(s) at operation 78 determines whether the moment of inertia of the vehicle 10 is located such that the center of gravity of the vehicle is at its threshold location for stability. If no, the controller(s) 58 will engage in conventional torque shaping based on stability attributes at operation 80. If yes, the controller(s) 58 will engage in conventional torque splitting between front and rear at operation 82.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   motors each configured to drive a front wheel of the vehicle;
   an electronic limited slip differential (eLSD) between rear wheels of the vehicle; and
   a controller programmed to, responsive to vehicle turning and
      a power of each of the motors being less than a maximum value, alter operation of the motors to increase a difference between the powers, and
      otherwise, operate the eLSD to bias torque toward one of the rear wheels.

2. The vehicle of claim 1, wherein the vehicle turning is left turning and wherein altering operation of the motors to increase a difference between the powers includes reducing the power of one of the motors configured to drive a driver side one of the front wheels and increasing the power of the other of the motors configured to drive a passenger side one of the front wheels.

3. The vehicle of claim 1, wherein the vehicle turning is right turning and wherein altering operation of the motors to increase a difference between the powers includes increasing the power of one of the motors configured to drive a driver side one of the front wheels and decreasing the power of the other of the motors configured to drive a passenger side one of the front wheels.

4. The vehicle of claim 1, wherein the vehicle turning is left turning and wherein operating the eLSD to bias torque toward one of the rear wheels includes reducing torque to a driver side one of the rear wheels and increasing torque to a passenger side one of the rear wheels.

5. The vehicle of claim 1, wherein the vehicle turning is right turning and wherein operating the eLSD to bias torque toward one of the rear wheels includes increasing torque to a driver side one of the rear wheels and reducing torque to a passenger side one of the rear wheels.

6. The vehicle of claim 1, wherein the controller is further programmed to, responsive to vehicle straight driving and the power of each of the motors being less than the maximum value, alter operation of the motors to increase the difference between the powers or operate the eLSD to bias torque toward one of the rear wheels.

* * * * *